United States Patent [19]

Asakura et al.

[11] Patent Number: 4,477,115
[45] Date of Patent: Oct. 16, 1984

[54] REAR WINDOW STRUCTURE FOR AN AUTOMOTIVE VEHICLE AND A WEATHERSTRIP WITH A SPOILER FIN THEREFOR

[75] Inventors: Noboru Asakura, Yokohama; Motoo Yanagawa, Zushi; Takatoshi Tsugahara, Kawasaki, all of Japan

[73] Assignee: Nissan Motor Company, Limited, Japan

[21] Appl. No.: 346,633

[22] Filed: Feb. 8, 1982

[30] Foreign Application Priority Data

Feb. 9, 1981 [JP] Japan .................................. 56-17890

[51] Int. Cl.³ .............................................. B62D 37/02
[52] U.S. Cl. .................................... 296/1 S; 180/903; 296/217
[58] Field of Search ............... 296/1 S, 91, 217, 37.16, 296/84 R; 180/903; 52/208, 397, 398

[56] References Cited

U.S. PATENT DOCUMENTS 3,233,937  2/1966  Barenyi ............................. 296/210
4,174,863 11/1979  Götz .................................. 296/1 S
4,274,670  6/1981  Pitzmann ........................... 296/1 S
4,291,912  9/1981  Fox .................................... 296/1 S
4,323,274  4/1982  Söderberg ......................... 296/1 S
4,363,510 12/1982  Burst ............................... 296/37.16

FOREIGN PATENT DOCUMENTS 0012852  6/1974  Australia .
 525322  8/1940  United Kingdom .
 694843  7/1953  United Kingdom .
1137770 12/1968  United Kingdom .

Primary Examiner—Duane A. Reger
Assistant Examiner—John A. Carroll
Attorney, Agent, or Firm—Lowe, King, Price & Becker

[57] ABSTRACT

A rear window structure of an automotive vehicle has a rear spoiler fin formed integrally with a weatherstrip for mounting a rear windshield to the vehicle body. The rear spoiler fin with the weatherstrip is conveniently equipped to the rear window and does not require any additional fastening structure. Thus, the rear window structure will improve traction of the vehicle without causing any difficulty in assembling.

12 Claims, 6 Drawing Figures

REAR WINDOW STRUCTURE FOR AN AUTOMOTIVE VEHICLE AND A WEATHERSTRIP WITH A SPOILER FIN THEREFOR

BACKGROUND OF THE INVENTION

The present invention relates generally to a rear window structure for an automotive hatchback type vehicle and the like, which improves vehicle traction by utilizing a simple construction. More particularly, the invention relates to a weatherstrip for the rear window, which is provided with a spoiler fin for better aerodynamics.

In view of automotive aerodynamics, a spoiler fin is most advantageously provided in the rear area of the automotive vehicle. As is well known, the rear spoiler fin reduces the drag coefficient of the vehicle driven at relatively high speeds and also serves to improve traction. Conventionally, the rear spoiler fin is made separately from the vehicle body and secured with a fastener or by appropriate mounting means so that it may protrude outwardly from the rear area of the vehicle. To safely mount the rear spoiler fin, the fastener or mounting means should be provided with sufficient strength so that it can prevent the rear spoiler fin from detaching while the vehicle is driven at high speeds wherein the rear spoiler fin is subject to a relatively forceful air stream. A known durable construction for mounting the rear spoiler fin makes the assembling process of the vehicle complicated.

SUMMARY OF THE INVENTION

It is a principle object of the invention to provide a rear vehicle window structue having a rear spoiler fin section which does not require any special treatment for fixing same onto the vehicle body.

Another object of the invention is to provide the rear window structure with a rear spoiler fin integrally formed with a weatherstrip for mounting the rear windshield.

To accomplish the above-mentioned and other objects of the invention, a rear vehicle window, according to the present invention, is provided with a weatherstrip for mounting the rear windshield. The weatherstrip has a section protruding outwardly from a main section which serves as a rear spoiler fin.

Preferably, the protruding section has an inclined angle with respect to the horizontal plane of approximately −20 to 60° degrees.

According to the present invention, there is provided a vehicle rear window structure comprising a vehicle body having a rear opening, a glass windshield received within the rear opening and a weatherstrip engaging the edge of the rear opening and circumferentially gripping the edge of the windshield. The weatherstrip has an integral fin section protruding so that it may reduce the drag coefficient of the vehicle and is positioned to extend rearwardly along the circumferential edge of the windshield.

In another aspect of the invention, there is provided a weatherstrip for a rear windshield of an automotive vehicle having a rear opening defined by a rear windshield frame. The weatherstrip includes a main section extending along a circumferential edge of the windshield. The main section has a groove for receiving the windshield therein. The main section is provided with another groove extending along the overall length thereof for receiving the windshield frame of the vehicle. The weatherstrip further has a fin section integrally formed with the main section and protruding backwardly from the main section. The fin section extends along at least one horizontal edge of the windshield.

BRIEF DESCRIPTION OF THE DRAWINGS

The present invention will be understood more fully from the detailed description give herebelow and from the accompanying drawings of the preferred embodiments of the present invention, which, however, should not be taken as limitative to the invention, but for elucidation and explanation only.

DESCRIPTION OF THE PREFERRED EMBODIMENT

Figure 1:
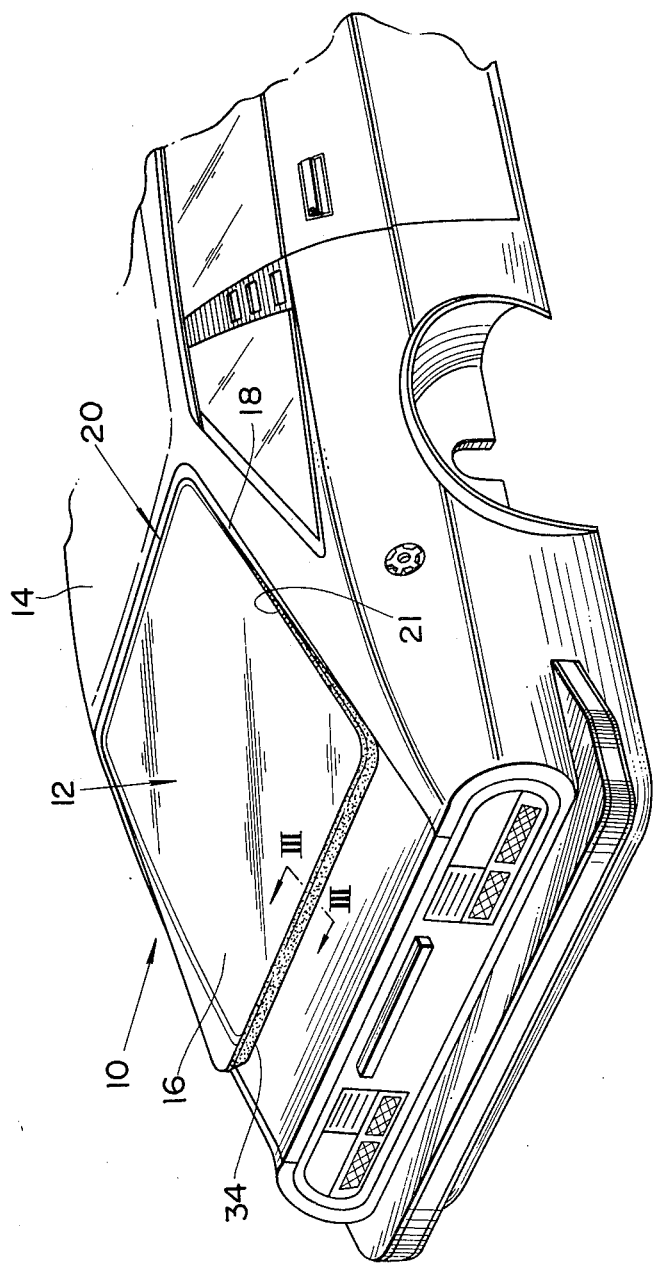
FIG. 1 is a perspective view of a rear portion of an automotive vehicle, wherein a rear window structure of the vehicle is equipped in accordance with the present invention.
Figure 2:
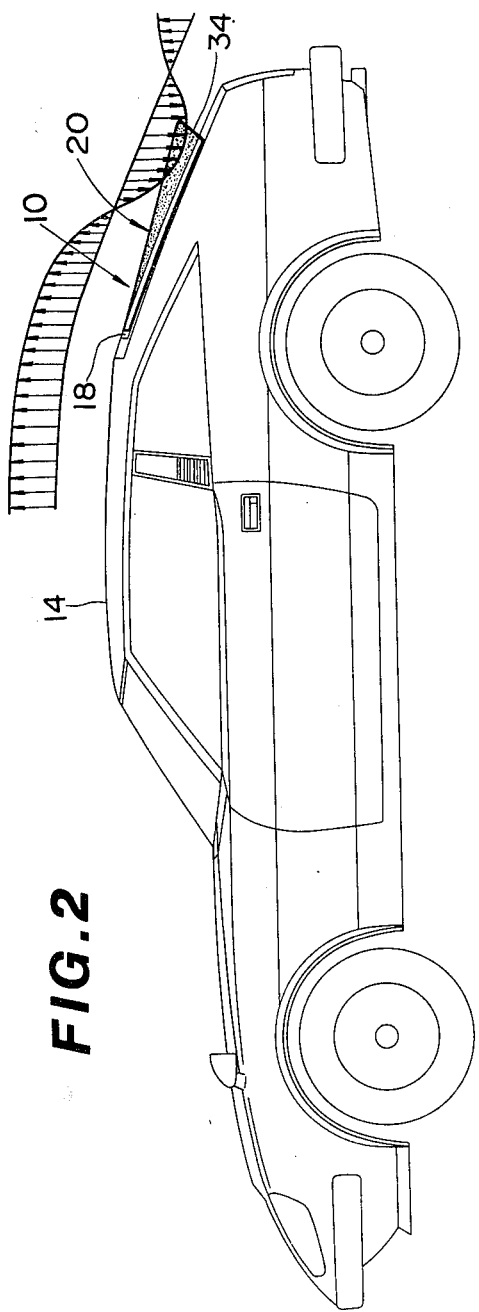
FIG. 2 is a side elevation of the rear portion of the vehicle of FIG. 1.
Figure 3:
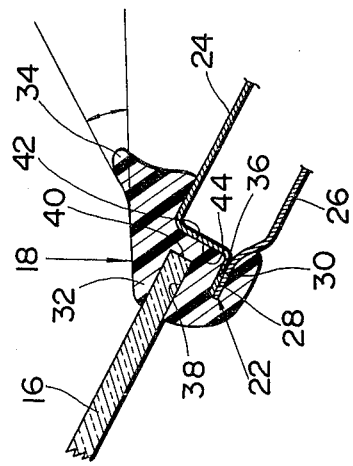
FIG. 3 is a cross-section taken along line III—III of FIG. 1.

Referring now to the drawings, particularly FIGS. 1 to 3, there is illustrated the preferred embodiment of a rear window structure and a weatherstrip therefor in accordance with the present invention. A hatchback type automotive vehicle is illustrated having a hatchback door 10 with a rear window 12. The hatchback door 10 is hinged at the upper end thereof to a rear opening of the vehicle body 14. The rear window 12 comprises a windshield glass 16 and a weatherstrip 18 which are assembled into a rear windshield assembly 20. The rear windshield assembly 20 is adhered to the windshield frame 22 defining an opening 21 to receive the rear windshield assembly.

As shown in FIG. 3, hatchback door 10 comprises a door outer panel 24 and a door inner panel 26. The outer and inner panels 24 and 26 are provided with bent ends 28 and 30 facing one another and fixed to each other to constitute windshield frame 22. The weatherstrip 18 has main section 32 serving a weatherstripping function and an integral, outwardly projecting fin section 34 which serves as a rear spoiler of the vehicle. Main section 32 of weatherstrip 18 is formed with grooves 36 and 38 extending around the overall length thereof. The groove 36 is adapted to engage windshield frame 22 in watertight contact. On the other hand, groove 38 is adapted to engage circumferential edge 40 of windshield glass 16 so that it may constitute the rear windshield assembly with the windshield glass having a substantially smooth outer surface. The edge 40 of the windshield and the groove 38 are preferably bonded together for constituting the windshield assembly 20 in a manner well known in the art.

The fin section 34 is integrally formed with main section 32 and extends along the lower edge of rear window 12 and the side edges of the window in a tapered fashion as shown in FIGS. 1 and 2. Fin section 34 extending along the widow side edges reinforces the major fin portion thereof extending along the lower horizontal edge, improving aerodynamic characteristics of the fin. As apparent from FIG. 2, fin section 34 serves as the aerodynamic rear spoiler to reduce the drag coefficient applied to the vehicle and, thus to improve traction of the vehicle by creating a downward aerodynamic force at the rear area of the vehicle.

On the other hand, the plane side edge 42 of the weatherstrip 18 faces a stepped portion 44 of the door outer panel 24 and is adhered thereto in a well known manner.

Figure 4:
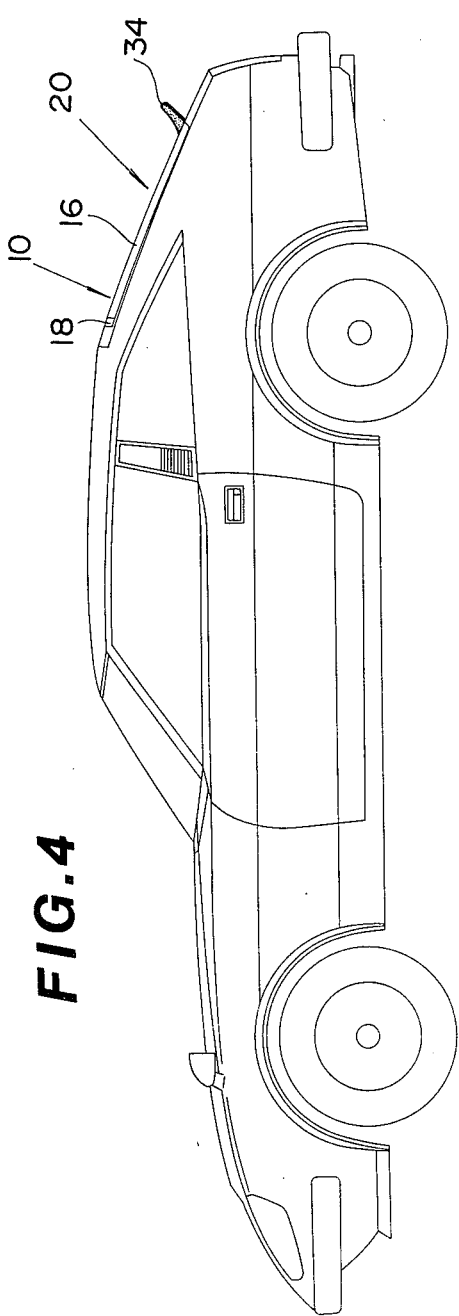
FIGS. 4 and 5 are side elevations similar to FIG. 2 but showing modifications of the embodiment of FIG. 1.
Figure 6:
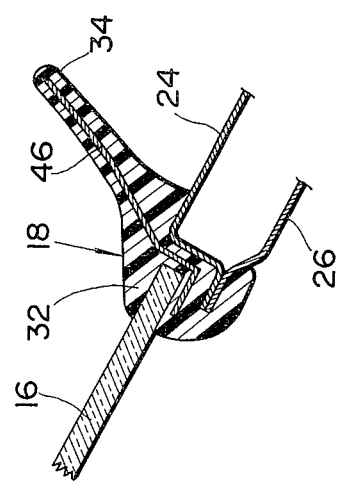
FIG. 6 is a cross-section similar to FIG. 3 but showing a modification of a weatherstrip construction.
Figure 5:
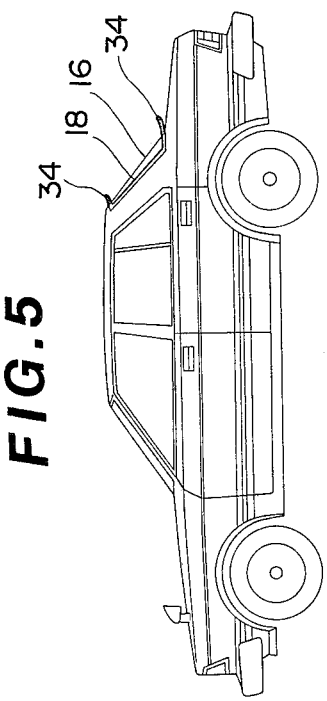

While the specific embodiment of the invention has been illustrated hereinabove, it may be possible to embody the present invention otherwise. FIGS. 4 to 6 show variations of the embodiment of FIGS. 1-3.

In FIG. 4, there is shown a rear window structure similar to the foregoing embodiment. In this modification, the spoiler fin 34 is provided only at the lower end of the rear window. In FIG. 4, the spoiler fin extends the overall length of the lower end of the window; however, it is also possible to provide the spoiler fin at only a part thereof which is still suitable for serving as an aerodynamic device. FIG. 5 is another modification of the rear window structure applicable for a vehicle such as a sedan and the like. For such kinds of cars, the rear spoiler fin 34 is preferably provided only at the top of the rear window or both the top and lower ends of the window.

In FIG. 6, the weatherstrip 18 is provided with a reinforcement member 46. The reinforcement member 46 is molded integrally with weatherstrip 18 and extends approximately the overall length of the fin section. Reinforcement member 46 may be made of a rigid material to provide sufficient strength to withstand bending even at relatively high speeds.

To fix the weatherstrip to the upper portion of the windshield frame or door, the drawing of FIGS. 3 and 6 are quite similar with the exception that the position of door outer panel 24 and glass windshield 16 are interchanged.

As will be appreciated, according to the invention there is provided a rear window construction capable of reducing the drag coefficient to improve traction of the vehicle but having a simple construction which can be mounted to the rear area of the vehicle in a manner similar to conventional methods.

What is claimed is:

1. An automotive vehicle having an improved rear window structure, comprising:
   a vehicle body having inner and outer panels with edges joined to establish a rear opening;
   a transparent window positioned within said rear opening; and
   a weatherstrip having a main portion engaging both an edge of said rear opening and circumferentially engaging an edge of said window, said main portion being integrally formed with a rear spoiler fin section protruding therefrom to reduce a drag coefficient of the vehicle, said fin section extending rearwardly along at least one circumferential edge of the window, said main portion extending continuously between the fin section and outer panel in sealing contact with the joined edges of the panels and in substantially continuous sealing contact with an outer surface of the outer panel adjacent the joined edges, said main portion between the fin and outer panel thereby establishing a continuous mass to support the fin on the outer panel.

2. A vehicle as set forth in claim 1, wherein said fin section extends along the lower circumferential edge of the window.

3. A vehicle as set forth in claim 1, wherein said fin section extends along the upper circumferential edge of the window.

4. A vehicle as set forth in claim 1, wherein said fin section extends along the lower horizontal edge and side edges of the window.

5. A vehicle as set forth in claim 1, 2, 3 or 4, wherein said fin section is inclined at an angle in the range of approximately −20 to 60 degrees with respect to a horizontal plane.

6. A vehicle as set forth in claim 1, further including a reinforcing member embedded within said fin section to reinforce same.

7. In a rear window structure for an automotive vehicle, a weatherstrip comprising:
   a main section extending along a circumferential edge of a windshield and having a first groove receiving said windshield and a second groove extending substantially entirely around the overall length of a rear window frame of the vehicle in engagement with the frame; and
   a fin section integrally formed with said main section and projecting rearwardly from said main section, said fin section extending adjacent at least one horizontal edge of said windshield, said fin section including a stiff reinforcing member embedded within the fin section, a lower end of the reinforcing member extending into the main section between a lower edge of the windshield and the rear window frame.

8. The window structure of claim 7, wherein said second groove sealingly engages inner and outer hatchback door panels of the vehicle.

9. A weatherstrip as set forth in claim 7, wherein said fin section extends along the lower horizontal edge of said windshield.

10. A weatherstrip as set forth in claim 7, wherein said fin section extends along the upper horizontal edge of said windshield.

11. A weatherstrip as set forth in claim 7, wherein said fin section extends along the lower horizontal edge and side edges of the windshield.

12. A weatherstrip as set forth in claim 7, 9, 10 or 11, wherein said fin section is inclined at an angle of about −20 to 60 degree with respect to a horizontal plane.

* * * * *